G. W. KIRKPATRICK.
VEHICLE SIGNAL.
APPLICATION FILED SEPT. 18, 1916.
1,298,057.
Patented Mar. 25, 1919.
2 SHEETS—SHEET 1.
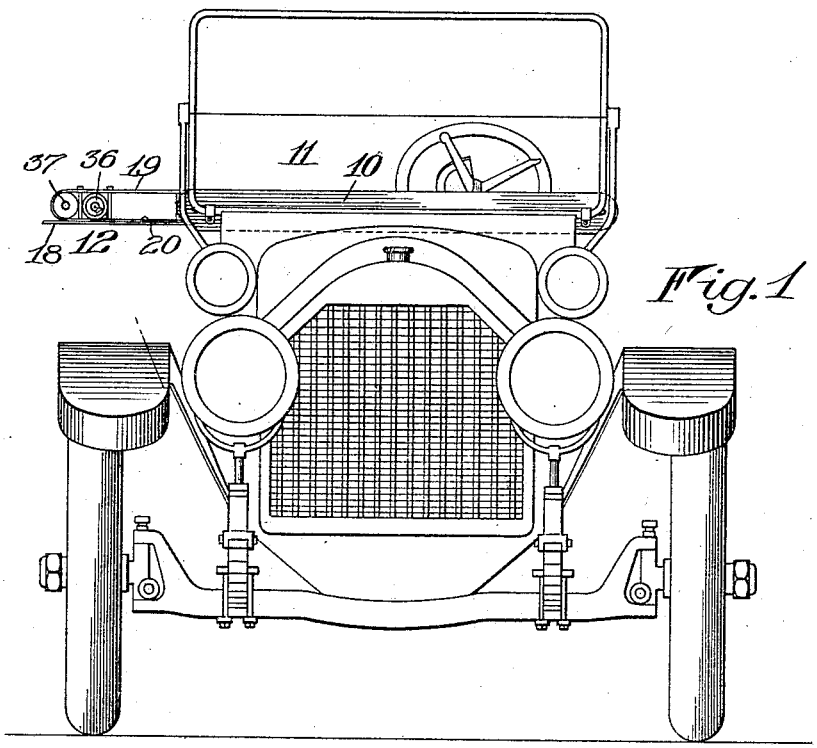
Fig.1
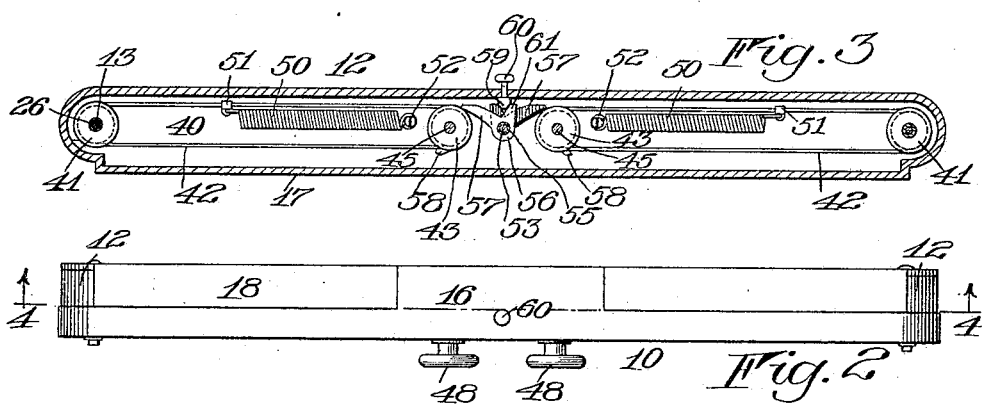
Fig.3
Fig.2
INVENTOR
George W. Kirkpatrick
BY
his ATTORNEYS G. W. KIRKPATRICK.
VEHICLE SIGNAL.
APPLICATION FILED SEPT. 18, 1916.
1,298,057.
Patented Mar. 25, 1919.
2 SHEETS—SHEET 2.
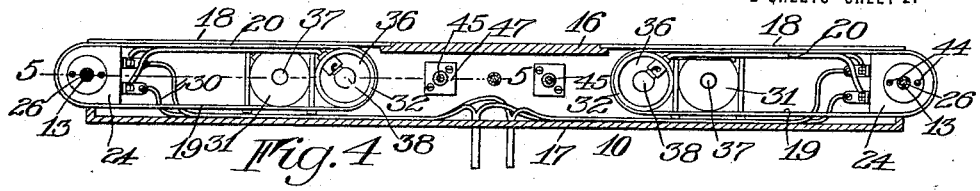
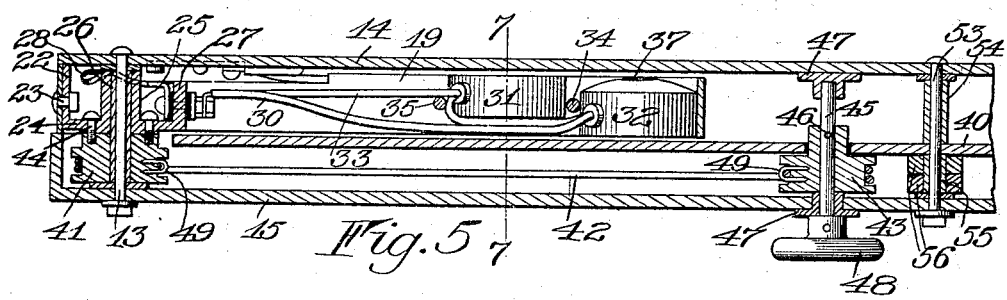
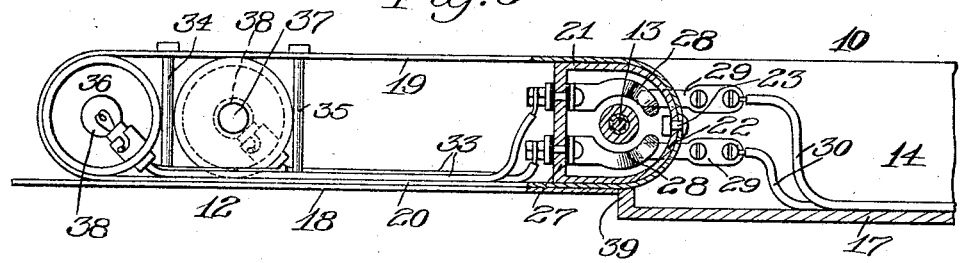
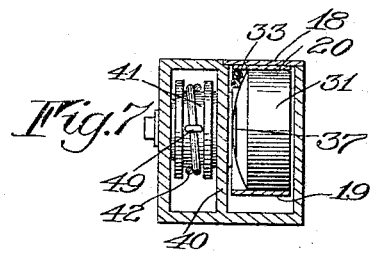
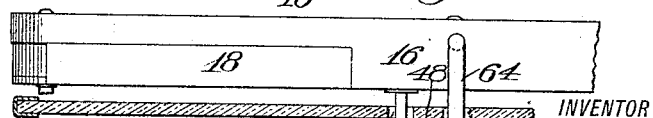
INVENTOR
George W. Kirkpatrick
BY
his ATTORNEYS

UNITED STATES PATENT OFFICE.

GEORGE W. KIRKPATRICK, OF ROCHESTER, NEW YORK.

VEHICLE-SIGNAL.

1,298,057.  Specification of Letters Patent.  Patented Mar. 25, 1919.

Application filed September 18, 1916. Serial No. 120,644.

*To all whom it may concern:*

Be it known that I, GEORGE W. KIRKPATRICK, a citizen of the United States, and resident of Rochester, in the county of Monroe and State of New York, have invented certain new and useful Improvements in Vehicle-Signals; and I do hereby declare the following to be a full, clear, and exact description of the same, reference being had to the accompanying drawings, forming a part of this specification, and to the reference characters marked thereon.

My invention relates to improvements in vehicle signals and has for its object to provide signals particularly adaptable for use on automobiles and arranged to be moved to project beyond the sides of the car when in signaling position. A further object of the invention is to provide a casing in which are inclosed signals movable to set positions beyond the sides of the car with means for returning the signals to normal position. A still further object of the invention is to provide signal carrying members at the sides of the car provided with inner and outer signals movable to signaling positions to become visible from opposide directions and arranged to be illuminated upon reaching said signaling positions. To these and other ends the invention consists in certain improvements and combinations of parts, all as will be hereinafter more fully described, the novel features being pointed out in the claims at the end of the specification.

In the drawings:

Figure 1 is a front elevation of an automobile showing one of the signaling arms in extended position at the side of the car;

Fig. 2 is a top plan view of the casing in which the arms are pivotally mounted;

Fig. 3 is a sectional elevation through the casing showing the operating mechanism for effecting movement of the signal arms;

Fig. 4 is a sectional elevation taken on line 4—4 of Fig. 2;

Fig. 5 is an enlarged sectional plan view taken on line 5—5 of Fig. 4;

Fig. 6 is an enlarged detail view of one of the signal arms partly in section and moved to exposed position upon the casing;

Fig. 7 is a cross sectional view taken on line 7—7 of Fig. 5, and

Fig. 8 is a plan view of one end of the signal casing located upon the outside of the windshield of the automobile with the operating handle shown extending through the shield.

Similar reference characters throughout the several views indicate the same parts.

The invention set forth herein comprises a casing 10 arranged to extend transversely of the car upon either the front or rear side of the windshield 11. The casing is provided at its opposite ends with signaling arms 12 pivotally mounted upon the bolts or pins 13 secured upon the front and rear side walls 14 and 15 of the casing. The top and bottom walls of the casing are indicated at 16 and 17 respectively, and the former is recessed to receive the covers 18 carried by the arms 12 for closing the casing at the points where the arms move into and out of the same. The arms are formed of upper and lower spaced plates 19 and 20 having rounded ends preferably formed integral with said plates. Between the plates at the pivoted ends of the arms are positioned the reinforcing members 21 in the form of castings having rounded ends walls 22 engaging the inner faces of the curved ends of the spaced plates as shown in Fig. 6. The reinforcing members are suitably connected with the arms preferably by the bolts 23. The arm reinforcing member is provided with a web or plate 24 carrying a hub or hollow projection 25 in which is positioned a sleeve or bearing 26 through which extends the pivot bolt 13. The web or plate 24 of the reinforcing member is provided with an upstanding wall 27, upon the inner face of which is mounted the insulated spring contact members 28 extending upon opposite sides of the hub 25 and curved inwardly toward each other as shown. The contact members, when the arm is in signaling or indicating position are adapted to connect with the terminals 29 from which extend the conductors 30 which may be connected with any suitable source for supplying current. In the end of the arm opposite the pivoted end and between the plates 19 and 20 are positioned the inner and outer electric lamps 31 and 32 respectively, which are connected with the spring contacts 28 by the wires or conductors 33 as shown in Figs. 5 and 6. The casing of the outer lamp 32 is fitted against the inner face of the curved end of the arm 12 and is held in engagement therewith preferably by the bolt 34 extending through the plates 19 and 20. The lamp 31 is also mounted between said plates by the side of the lamp 32 and is secured by the bolts 34 and 35 as shown in Fig. 6. The lamps are preferably provided with relatively large and small translucent plates or lenses 36 and 37 upon opposite sides of the globes 38 and the larger lens of the outer lamp is positioned so as to be seen from the rear of the car which is wider than the front, while the larger lens of the inner lamp is made visible from the front of the car. Two lamps have been provided on each arm in order to obtain the advantage of the reflectors at the back of the lights. One of the lights has been placed farther out upon the arm than the other for the reason that to place them back to back would necessitate doubling the width of the arms and correspondingly increasing the width of the casing which would be objectionable. The cover 18 of the arm when the latter is in the position shown in Fig. 6, is adapted to engage the end wall 39 of the casing to hold the arm in a horizontal position as shown. When the arm is in normal position the casing is completely closed by the cover as indicated in Figs. 2 and 8. The casing is preferably provided with a division wall 40 dividing it into front and rear compartments, the former containing the signaling arms and the latter the operating mechanism for said arms. The arm operating mechanism comprises a grooved wheel 41 mounted on the bearing 26 supported by the bolt 13, said wheel being connected by a cable 42 with another grooved wheel 43 near the center of the casing. The wheel 41 is rigidly connected with the reinforcing member 21 of the arm preferably by means of the screws 44 and the grooved wheel 43 is rigidly connected with a shaft 45 by means of a pin 46. The shaft 45 is journaled in the bearings 47 carried by the walls of the casing as shown in Fig. 5. The shafts 45 are provided with operating handles 48 which when turned one to the left and the other to the right, will move the arms upon their pivots to a horizontal signaling position beyond the side of the car. The cables 42 have their opposite ends wound upon the pulleys within the grooves and secured thereon by any suitable fastening means such as the staples 49. A coil spring 50 is provided for returning the arms to their normal position and is suitably connected at 51 to the upper portion of the cable as shown in Fig. 3, the opposite end of the spring being secured at 52 to the side wall of the casing. Between the two pulleys 43 and extending through the vertical walls of the casing is a bolt 53 upon which is mounted the front and back spacing thimbles 54 and 55 respectively, between the adjacent ends of which the partition 40 is held. Pivotally mounted upon the thimble 55 is a pair of locking members 56 each having oppositely extending fingers 57, one resting upon the front flange of one of the pulleys and the other upon the rear flange of the other pulley. When the arms are moved to signaling position the fingers are adapted to be slightly elevated by the locking projections 58 of the flanges of the pulleys and as soon as the projections pass the fingers the latter drop down behind said projections and prevent the return of the pulleys to normal position by the action of the springs 50 until said fingers are released. Release of the fingers is accomplished by a wedge shaped member 59 having a shank extending through the upper wall of the casing and provided with a handle 60 for actuating the wedge shaped member. The latter is adapted to engage the oppositely inclined faces 61 of the locking members 56 as shown in Fig. 3. By pushing down on the handle 60 the fingers 57 are elevated to disengage the projections 58, at which time the springs 50 return the signal arms to normal position within the casing by means of the pull exerted upon the upper portions of the cables 42. The operation will be the same regardless of whether one or both of the signaling arms are in set position as both of the fingers are actuated simultaneously by pushing the handle 60. By means of the fingers and projections 58 either or both of the signals may be set and held in signaling position as long as desired.

When it is desired to place the casing upon the outside of the car in front of the windshield as shown in Fig. 8 apertures 62 are formed through the windshield to allow the shafts upon which the handles 48 are mounted to extend into the car at a point convenient to the driver thereof. Likewise an aperture 63 is formed through the windshield to receive the operating handle 64 by means of which the fingers are actuated for releasing the pulleys 43.

It will be understood that I do not wish to limit myself to the cord or cable and pulley shown in Fig. 3, as any other suitable arm operating mechanism may be used without departing from the spirit of the invention such as a chain and sprocket arrangement.

I claim as my invention:

1. A vehicle signaling device comprising a casing, oppositely positioned signaling arms pivotally mounted upon the casing normally resting therein, a flexible member operatively connected with each of the arms, a rotatable member connected with each of the flexible members for effecting movement of the arms from the casing, a resilient member connected with each of said flexible members arranged to be tensioned by movement of said flexible members to move the arms to signaling position, a pair of pivotally mounted and oppositely extending locking members each adapted to engage one of the rotatable members to lock the same against backward movement through the action of said resilient members when the arms are moved from the casing, oppositely inclined faces carried by said locking members, and a wedge shaped member engaging said inclined faces and adapted to be moved to cause the locking members to disengage and release said rotatable members.

2. A vehicle signaling device comprising a casing, oppositely positioned signaling arms pivotally mounted upon the casing and normally resting therein, a pair of rotatable members each operatively connected with one of the arms for moving the same from the casing to signaling position, resilient members for returning the arms from signaling to normal position, locking members arranged to engage the rotatable members to prevent movement of the latter when either of the arms are in signaling position, oppositely positioned inclined faces carried by said locking members, and a wedge shaped member engaging said faces and movable to effect the release of one or both of the locking members.

3. A vehicle signaling device comprising a casing, a signaling arm pivotally mounted upon the casing, means for moving the arm to and from the casing, and inner and outer lamps carried by the arm arranged to face in opposite directions.

4. A vehicle signaling device comprising a casing, a signaling arm pivotally mounted upon the casing, means for moving the arm to and from the casing and inner and outer lamps carried by the arm each provided with relatively large and small illuminated faces visible from opposite directions, the larger illuminated face of one lamp being positioned upon the opposite side of the arm from the larger face of the other lamp.

5. In a vehicle signaling device, the combination of a casing, a signaling arm pivotally mounted thereon, means for projecting the arm from the casing, inner and outer lamps carried by the arm arranged to face in opposite directions, and means for locking the arm in projected position.

6. In a vehicle signaling device, the combination of a casing, a signaling arm pivotally mounted thereon, inner and outer lamps on said arm, means for projecting the arm from the casing, means for locking the arm in projected position, and a spring for automatically returning the arm to the casing when the locking means is released.

GEORGE W. KIRKPATRICK.

Copies of this patent may be obtained for five cents each, by addressing the "Commissioner of Patents, Washington, D. C."